(12) United States Patent
Raines et al.

(10) Patent No.: US 9,457,760 B1
(45) Date of Patent: Oct. 4, 2016

(54) ACTIVE GLOVE BOX DOOR WITH VENTILATED REACTION PLATE

(71) Applicant: FORD GLOBAL TECHNOLOGIES, LLC, Dearborn, MI (US)

(72) Inventors: Stacey H. Raines, Ypsilanti, MI (US); Tyler Cohoon, Detroit, MI (US); Peter J. Bejin, Northville, MI (US); Kaitlin M. Cischke, Bloomfield Hills, MI (US); Nicholas A. Mazzocchi, Ann Arbor, MI (US); Raffi B. Manoukian, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/686,048

(22) Filed: Apr. 14, 2015

(51) Int. Cl.
*B60R 21/239* (2006.01)
*B60R 21/215* (2011.01)
*B60R 21/00* (2006.01)

(52) U.S. Cl.
CPC .......... *B60R 21/239* (2013.01); *B60R 21/215* (2013.01); *B60R 2021/0051* (2013.01); *B60R 2021/0053* (2013.01); *B60R 2021/21506* (2013.01); *B60R 2021/21537* (2013.01); *B60R 2021/21543* (2013.01)

(58) Field of Classification Search
CPC ............... B60R 21/231; B60R 21/02; B60R 2021/0273; B60R 2021/0053; B60R 2021/0407; B60R 2021/0051; B60R 21/239; B60R 21/215; B60R 2021/21543; B60R 2021/21506; B60R 2021/21537
See application file for complete search history.

(56) References Cited

U.S. PATENT DOCUMENTS

| | | | | |
|---|---|---|---|---|
| 6,213,497 B1* | 4/2001 | Spencer | ................ | B60R 21/045 280/730.1 |
| 6,247,745 B1* | 6/2001 | Carroll, III | .......... | B60N 2/4249 188/371 |
| 6,416,079 B1* | 7/2002 | Lutz | ...................... | B60R 21/045 280/730.1 |
| 6,619,689 B2* | 9/2003 | Spencer | ................ | B60R 21/045 280/730.1 |
| 6,758,493 B2* | 7/2004 | Conlee | .................. | B60R 21/045 224/280 |
| 7,367,587 B2* | 5/2008 | Taoka | ................... | B60R 21/045 280/728.2 |
| 7,841,617 B2* | 11/2010 | Brandstatter | ....... | B60R 21/2165 280/728.3 |
| 8,308,186 B1* | 11/2012 | Orlowsky | ............... | B60R 21/04 280/728.2 |
| 8,328,230 B1* | 12/2012 | Kalisz | .................... | B60R 21/04 280/730.1 |
| 8,328,233 B2* | 12/2012 | Kalisz | ................... | B60R 21/02 280/730.1 |

(Continued)

*Primary Examiner* — Paul N Dickson
*Assistant Examiner* — Timothy Wilhelm
(74) *Attorney, Agent, or Firm* — Vichit Chea; MacMillan, Sobanski & Todd, LLC

(57) ABSTRACT

An active glove box door includes a bladder member joined along an outer perimeter with a front wall by a hot weld seam to form an inflatable bladder. The bladder member includes a circumferential pleat for unfolding in response to an inflation gas during a crash event. A door inner liner is joined to a central region of the bladder member and forms a generally continuous plate behind the bladder member. The door inner liner interfaces with the instrument panel to provide a reaction surface for expansion of the bladder. The pleat has a peak disposed proximate to the door inner liner, wherein the peak includes a vent opening that delineates a collision region on the door inner liner. The door inner liner includes a plurality of perforations in the collision region permitting flow of inflation gas from the vent opening through the door inner liner.

11 Claims, 8 Drawing Sheets

(56) References Cited

U.S. PATENT DOCUMENTS

| | | | |
|---|---|---|---|
| 8,336,910 B1 * | 12/2012 | Kalisz | B60R 13/0243 280/730.1 |
| 8,448,980 B1 * | 5/2013 | Kalisz | B60R 21/237 280/730.1 |
| 8,454,054 B1 * | 6/2013 | Raines | B60R 21/239 280/730.1 |
| 8,459,689 B2 * | 6/2013 | Roychoudhury | B60R 7/06 280/730.1 |
| 8,491,008 B2 * | 7/2013 | Roychoudhury | B60R 21/235 280/752 |
| 8,544,878 B1 * | 10/2013 | Kalisz | B60R 21/02 280/730.1 |
| 8,544,879 B1 * | 10/2013 | Mazzocchi | B60R 21/02 280/730.1 |
| 8,573,643 B1 | 11/2013 | Kalisz et al. | |
| 8,579,325 B2 * | 11/2013 | Roychoudhury | B60R 21/02 280/752 |
| 8,720,943 B1 * | 5/2014 | Mazzocchi | B60R 21/04 280/730.1 |
| 8,720,948 B2 * | 5/2014 | Raines | B60R 21/04 280/728.3 |
| 8,931,803 B2 | 1/2015 | Roychoudhury | |
| 9,156,423 B1 * | 10/2015 | Aselage | B60R 21/239 |
| 9,260,075 B2 * | 2/2016 | Young | B60R 21/276 |
| 9,302,414 B2 * | 4/2016 | Aselage | B29C 45/14008 |
| 2012/0267878 A1 * | 10/2012 | Kalisz | B60R 13/02 280/728.2 |

* cited by examiner

ACTIVE GLOVE BOX DOOR WITH VENTILATED REACTION PLATE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to an active bolster with an inflatable bladder formed by plastic wall panels that are hot welded to form a hermetic seal wherein one wall is vented for a controlled release of inflation gas.

An active bolster is a vehicle occupant protection device with a gas-inflatable bladder to absorb impacts and reduce trauma to occupants during a crash. As opposed to deployable air bag cushions made of various fabrics that emerge from behind various openings upon inflation, active bolsters use the interior trim surface (e.g., instrument panel dashboard, glove box, passenger door, or seat back) itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes a front wall or trim panel that faces a vehicle occupant and is attached to a back wall or bladder member along a sealed periphery. One or both of the walls is deformable in order to provide an expandable, inflatable bladder. For example, the bladder member may have a pleated (i.e., accordion-like) region that straightens out during inflation.

The front and back walls of a typical bladder for an active bolster are comprised of molded thermoplastics such as polyethylene, polyolefin, or PVC. They are typically injection molded but can also be blow molded. When formed separately, the front and back walls must be hermetically joined around their periphery in order to form the inflatable bladder. The joint must be strong to resist separation that could result from high inflation pressures during inflation and that result when a passenger impacts the bolster. The peripheral seal is formed by hot welding, for example.

It is known that in order to optimize the dissipation of energy when an occupant contacts an air bag or an active bolster, inflation gas should be vented to allow a controlled collapse of the airbag that safely decelerates the impacting occupant. U.S. Pat. No. 8,720,943, issued May 13, 2014, which is incorporated herein by reference, discloses an active vent structure for providing a variable vent flow rate.

Various types of structures and locations on a pleated bladder member have been disclosed for venting inflation gas during inflation and during loading by an impacting passenger. Venting locations have been disclosed on the central, flat areas of the bladder wall, in the pleated baffle region of the bladder wall, and in welding towers that attach the bladder wall to a reaction surface, for example. It has been suggested that vents can be placed 1) in close proximity to local regions where the stresses of inflation forces may create a highest probability of weld failure, or 2) with a spatial distribution that adjusts the restraint forces provided at different regions of the bolster. Since it is desirable to locate the vent(s) close to the hot weld seam, the outermost pleat is often selected for the vent locations. With injection molding of the bladder member, the window openings for vents on the outermost pleat have been located at the top (i.e., peak) of the pleat since that facilitates the injection molding process and simplifies the molding tools.

Due to space considerations in a typical automotive passenger compartment, it is advantageous for the uninflated bolster assembly to be relatively thin. In order to fit an active bolster into the available depth of a glove box door, for example, requires that the pleated baffle of the bladder wall will be disposed very closely to an inner door liner acting as a reaction plate to support bladder expansion. Therefore, the vent opening in the peak of a pleat is close to the door liner, which delineates a collision region where inflation gas exiting the vent opening impinges of the door liner. Due to the partial obstruction of gas flow, the vent opening has not provided the intended pressure relief or the desired decrease in weld stress during the initial stages of inflation.

SUMMARY OF THE INVENTION

In one aspect of the invention, an active glove box door is provided for mounting in an opening of an instrument panel in an automotive vehicle. A plastic-molded front wall deploys outward from the opening. A plastic-molded bladder member is joined along an outer perimeter with the front wall by a hot weld seam to form an inflatable bladder. The bladder member includes at least one substantially circumferential pleat adjacent the weld seam for unfolding in response to an inflation gas injected into the inflatable bladder during a crash event. A door inner liner is joined to a central region of the bladder member. The door liner forms a generally continuous plate behind the bladder member. The door inner liner interfaces with the instrument panel to provide a reaction surface for expansion of the bladder member. The pleat has a peak disposed proximate to the door inner liner, wherein the peak includes a vent opening that delineates a collision region on the door inner liner. The door inner liner includes a plurality of perforations in the collision region permitting flow of inflation gas from the vent opening through the door inner liner.

DETAILED DESCRIPTION OF PREFERRED EMBODIMENTS

Figure 1:
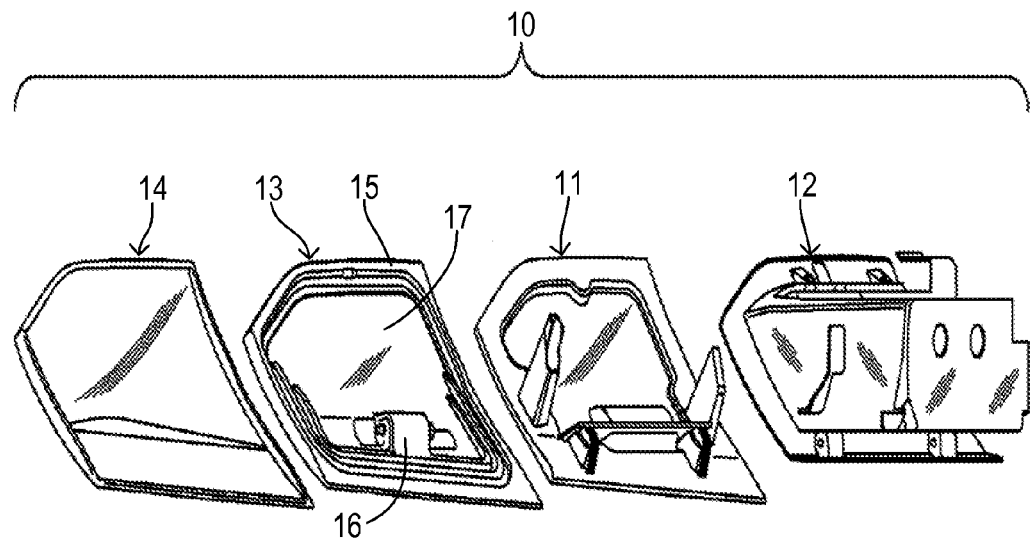
FIG. 1 is an outward-looking, exploded perspective view of an active knee bolster glove box door system of a type to which the present invention can be applied.

Referring now to FIG. 1, a prior art active knee bolster system 10 has a base panel component 11 which forms the foundation for the bolster. Base 11 may be either attached to the vehicle by hinging from a storage cavity or glove box 12 as shown in FIG. 1, or mounted to another structure such as an instrument panel support located below a steering column, for example. Such locations are accessible to the knees of an individual passenger riding in a corresponding seating position within a vehicle.

In this arrangement, base 11 is a door inner wall or liner that acts as a reaction plate for supporting an inflatable bladder formed by a back (bladder) wall 13 and a front (trim) wall 14 that are joined around their periphery 15. Walls 13 and 14 are preferably comprised of molded plastics (such as thermoplastic polyolefin (TPO)) and are joined by plastic hot welding, such as hot plate or vibration welding, to form a peripheral seal around a central region 17 for forming an inflatable bladder. An inflation gas source 16 is electronically controlled for activating during a crash to release gas to inflate the bolster. Front wall 14 may comprise the Class A interior trim surface such as the outside of the glove box door, or an additional skin or cover (not shown) can be applied to its outer surface.

Figure 2:
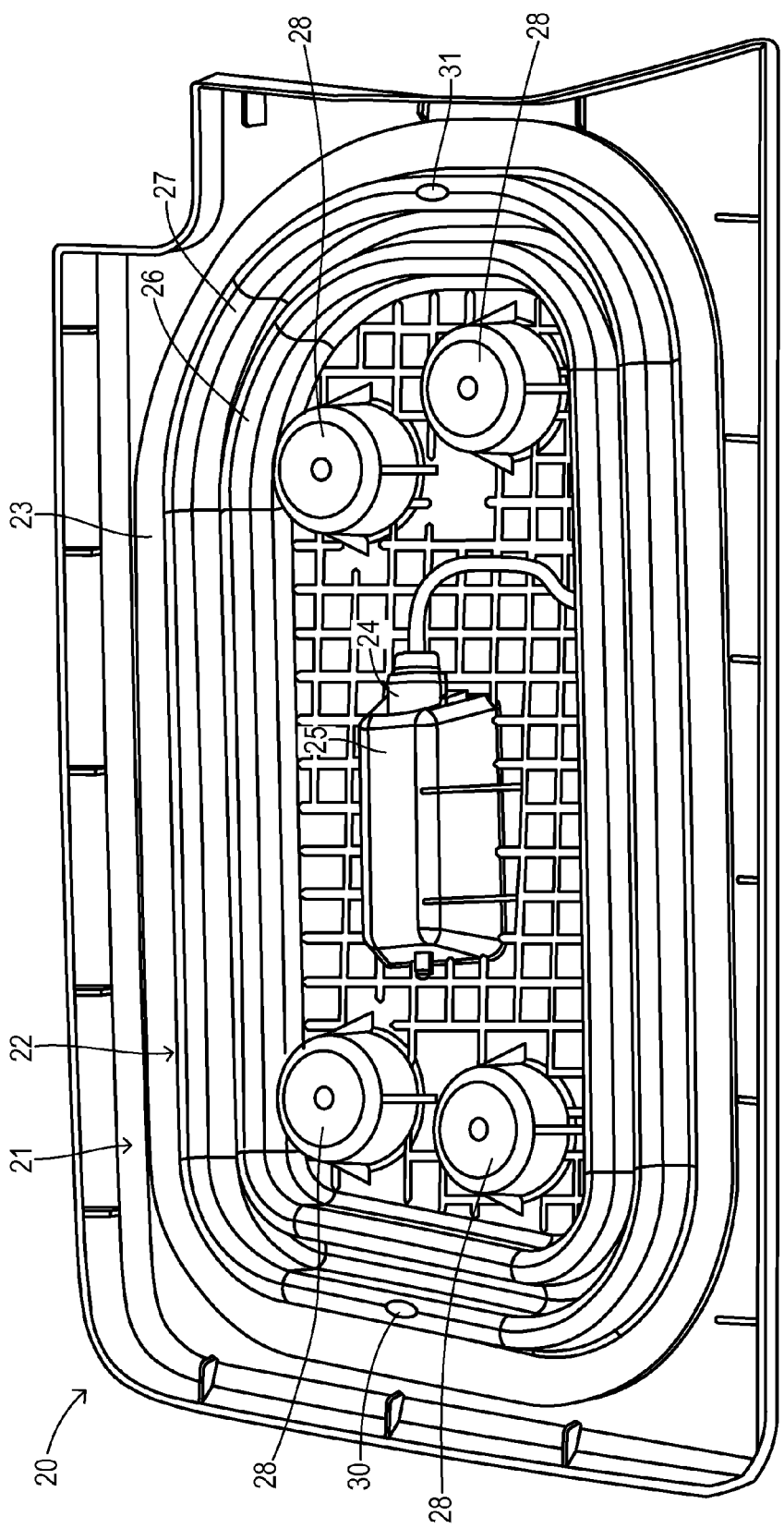
FIG. 2 is a rear perspective view of a partial inflatable bladder assembly of an active bolster.

FIG. 2 is a rear view of an inflatable bladder assembly 20 for an active bolster. A plastic-molded front wall or trim panel 21 overlies a plastic-molded, expandable back wall or bladder member 22. Wall 21 and bladder member 22 are joined around a closed perimeter region by hot welding a flange 23 to an inside surface of trim wall 21 in order to form an inflatable bladder having an open central volume between wall 21 and bladder member 22 to receive an inflation gas from an inflator 24 mounted in a recess 25 of bladder member 22 during a crash event. Bladder member 22 includes a plurality of pleats, such as 26 and 27, to accommodate the expansion of bladder member 22 during inflation. Pleat 27 is an outermost pleat which is adjacent to welding flange 23. A plurality of attachment towers (i.e., bosses) 28 project from a central region of bladder member 22 disposed within baffle pleats 26 and 27. Towers 28 are used to mount bladder member 22 to a reaction plate (not shown) such as an inner door liner for an active glove box door bolster. A pair of vent holes 30 and 31 penetrate through bladder member 22 at a peak of outermost pleat 27.

Figure 3:
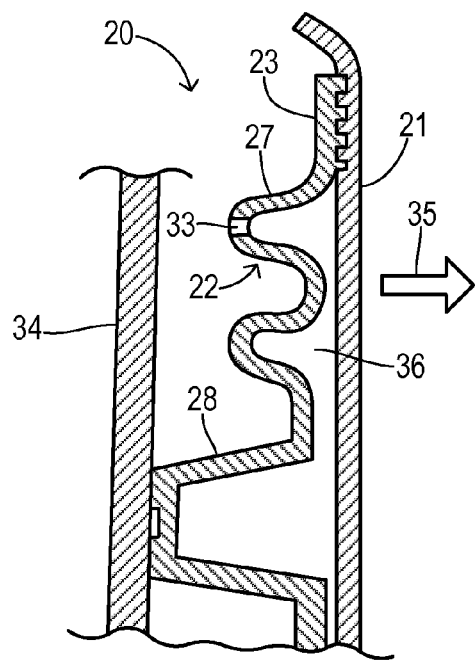
FIG. 3 is a side cross section showing a prior art active bolster assembly.

FIG. 3 shows a cross-section of bladder 20 as assembled onto a reaction plate or wall 34. Attachment tower 28 may be hot welded to reaction wall 34, for example. Baffle pleat 27 is penetrated by a window opening 33 to provide a vent. During deployment as a result of an inflation gas being supplied into a bladder cavity 36, front trim wall 21 deploys in a deployment direction 35 toward a passenger in the passenger compartment of a vehicle.

Figure 4:
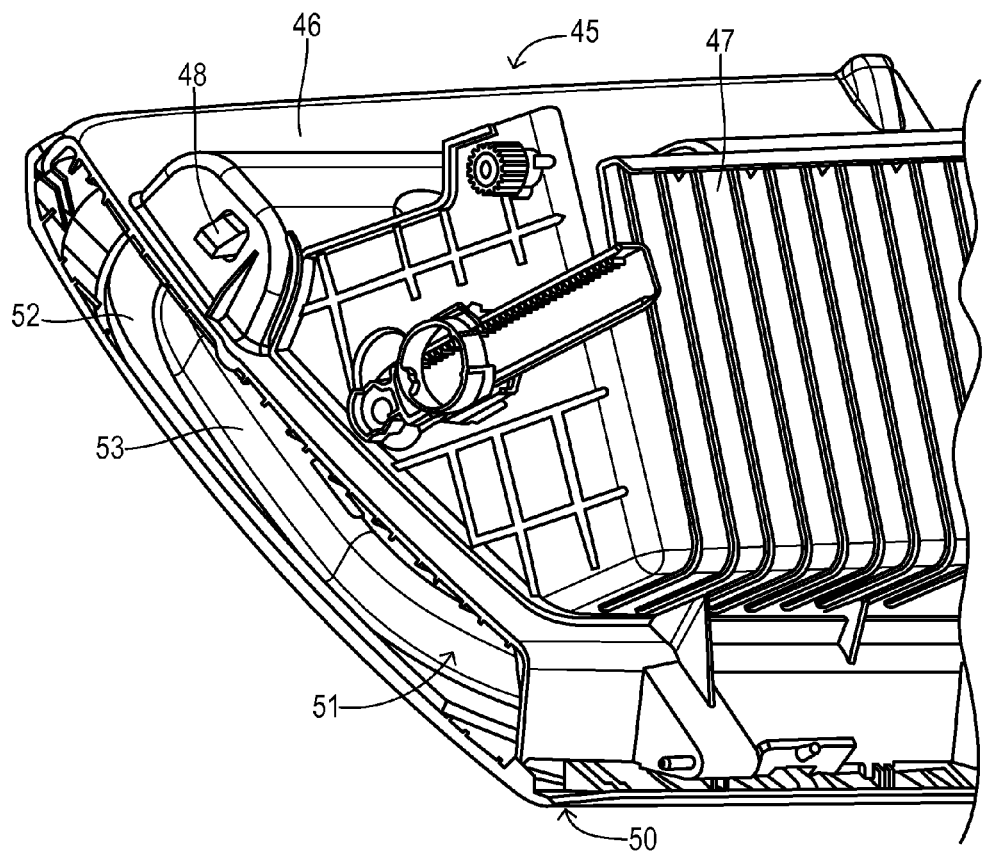
FIG. 4 is a rear perspective view of an active glove box assembly with an edge partially broken away.

FIG. 4 shows an active glove box assembly 45 including a door inner liner or plate 46 providing a reaction surface for an inflatable bolster and which supports a storage bin 47 and a latch 48. A front trim wall 50 is attached to a bladder member 51 along a welding flange 52. An outermost pleat 53 is disposed adjacent to flange 52. A central region (not shown) of bladder member 51 is attached to door inner liner/reaction plate 46. Inner door liner 46 is formed as a generally continuous plate behind bladder member 51 and is configured to interface with the instrument panel and/or a fixture or frame (not shown) surrounding an opening for active glove box door assembly 45.

Figure 5:
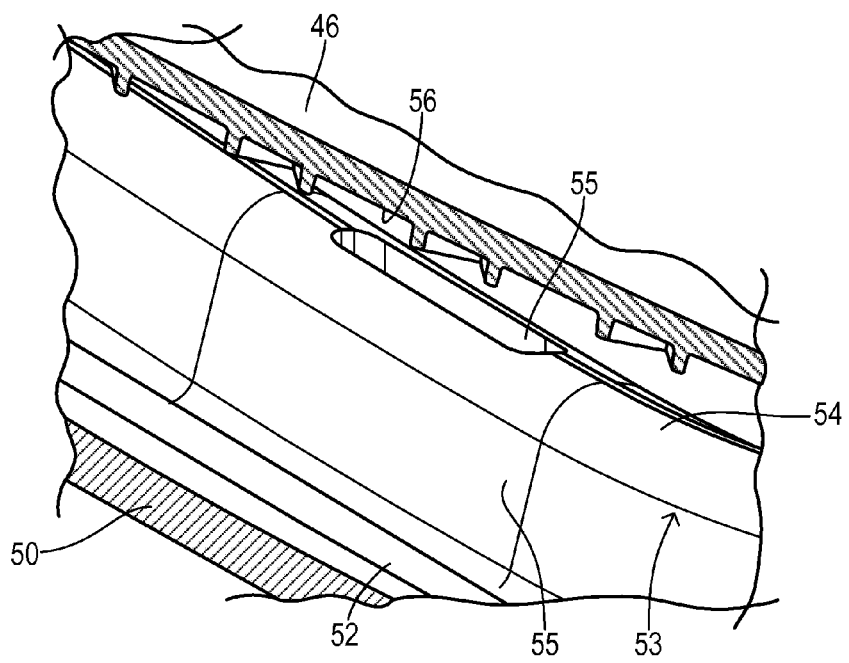
FIG. 5 is an enlargement of a portion of FIG. 4 including a vent opening.
Figure 6:
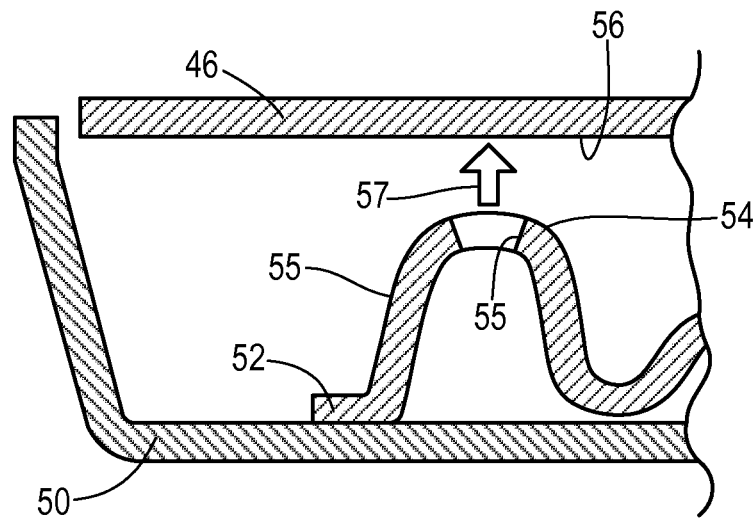
FIG. 6 is a cross section showing an interface of a prior art vent opening with a reaction surface.

As shown in FIG. 5, outermost pleat 53 includes a peak 54 that closely approaches inner door liner 46. Within peak 54, pleat 53 includes a vent opening 55. Prior to unfolding of pleat 53 during initial stages of inflation, the inflation gas exiting vent opening 55 is restricted by inner door liner 46 in a collision region 56. This is shown in greater detail in FIG. 6, wherein a flow path 57 for inflation gas being exhausted through vent opening 55 is partially obstructed by the close proximity of reaction wall 46. Collision region 56 is delineated by the location of vent opening 55, i.e., by the projection of opening 55 onto inner door liner 46 in the direction of gas flow path 57. Consequently, excessive inflation gas pressure can build up along the weld seam that joins flange 52 to trim wall 50 because of the reduction in the effective flow rate through vent opening 55. Increasing the size of vent opening 55 to raise the initial flow rate and to reduce the initial stress from pressure buildup may be undesirable because it would result in too high of a flow rate after pleat 53 begins to unfold and reaction wall 46 ceases to provide an obstruction.

Figure 7:
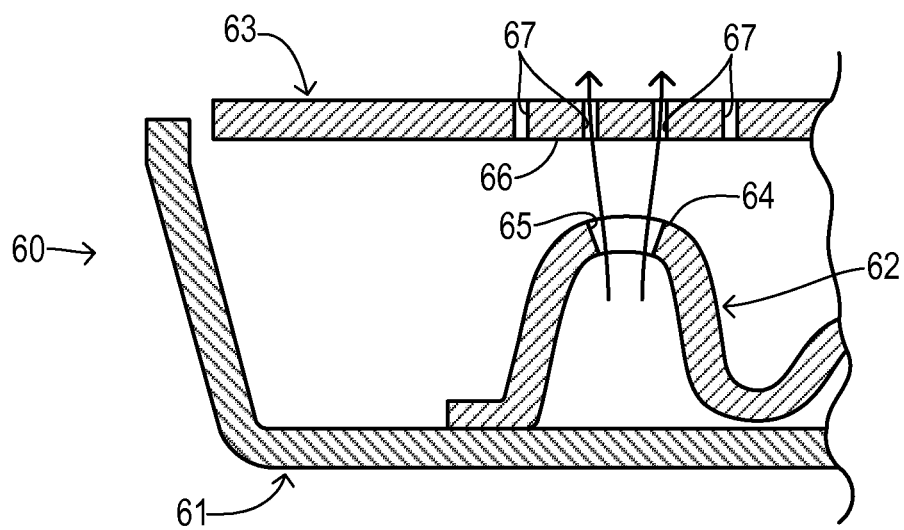
FIG. 7 is a cross section showing a modified reaction plate of the present invention.

FIG. 7 shows a cross-section of a first embodiment of the invention wherein an active glove box door assembly 60 has a front trim panel 61, a bladder member 62, and an door inner liner/reaction plate 63. Each component is preferably comprised of an injection molded plastic part. Bladder member 62 has a peak 64 of an outermost pleat where a vent opening 65 is formed proximate to a collision region 66 on door inner liner 63. The plurality of perforations 67 in collision region 66 permit flow of an inflation gas from vent opening 65 through door inner liner 63. By ventilating door inner liner 63, the obstruction to inflation gases exiting vent 65 is reduced. Since the area within the pleat is maintained at a lower pressure, less stress is created at the hot weld joining bladder member 62 with trim panel 61. By restricting perforations 67 to locations only within collision region 66, door inner liner 63 can still provide a sealed, continuous surface for the majority of door inner liner 63 (which is very desirable for both aesthetic and functional reasons for the inner wall of a glovebox door).

Figure 8:
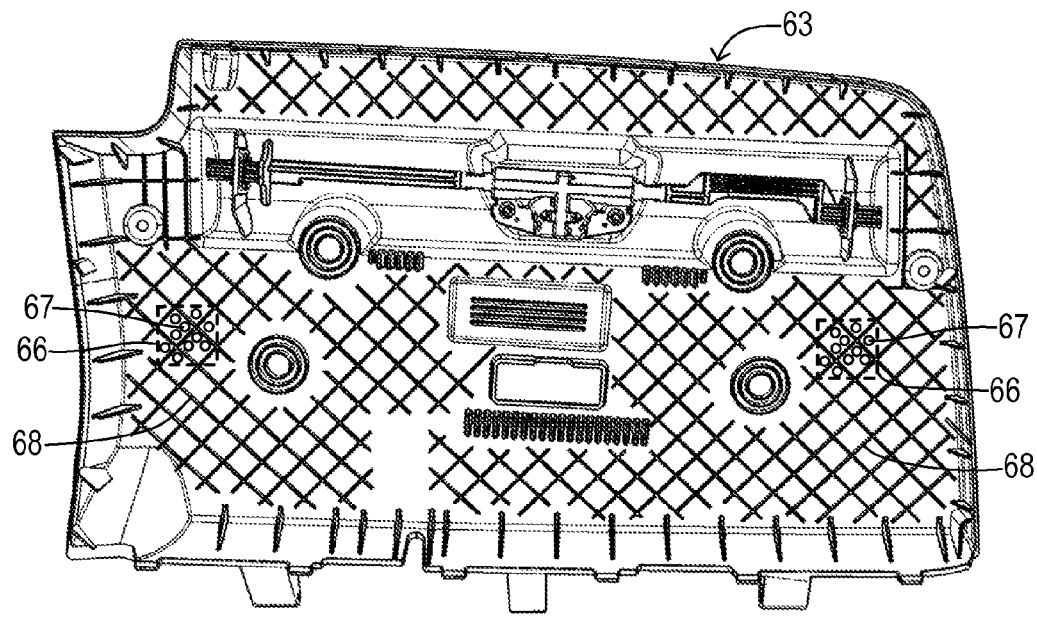
FIG. 8 is a plan view of the inner side of a door inner liner according to one embodiment.

FIG. 8 is an interior view of door inner liner 63, wherein a plurality of strengthening ribs 68 crisscross over much of the interior side of liner 63 for added strength and rigidity. Perforations 67 may be formed within collision region 66 in a pattern that avoids ribs 68. Alternatively, ribs 68 can be discontinued within collision region 66, or perforations 67 can alternatively penetrate the ribs.

Figure 9:
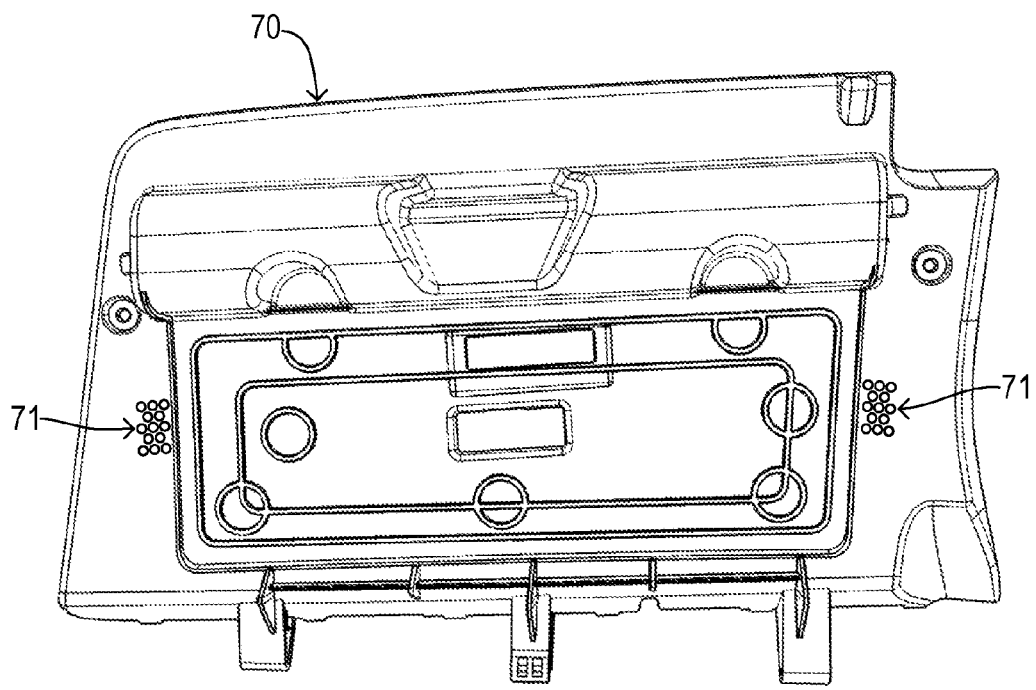
FIG. 9 is a plan view of the outer side of a door inner liner according to an embodiment with perforations in a grille pattern.

FIG. 9 shows an outside surface of a door inner liner 70 showing a plurality of perforations 71 disposed in respective collision regions for each of a plurality of vent openings in the bladder member (not shown). Perforations 71 may be arranged in a grille pattern with the hole diameters and spacings selected to provide a flow cross-section that is sufficient to vent inflation gas as needed. The grille pattern may have a plurality of offset rows such as often used for a cover of a loudspeaker.

Figure 10:
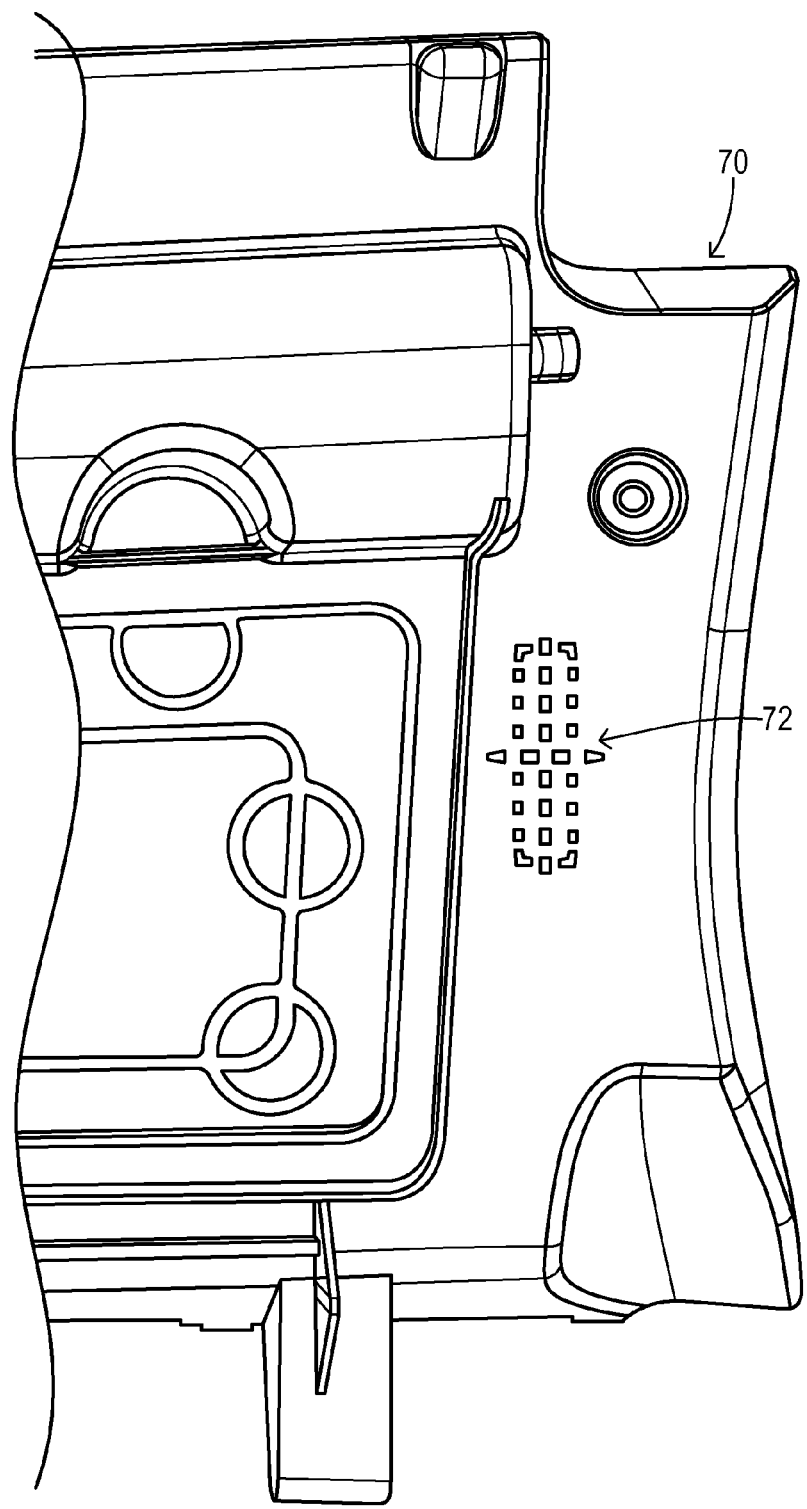
FIG. 10 is a plan view of the outer side of a door inner liner according to an embodiment with perforations in a logo pattern.

FIG. 10 shows door inner liner 70 with a plurality of perforations 72 formed in a collision region and arranged according to a logo pattern. As used herein, logo pattern means any stylized arrangement depicting a desired graphic, textual element, or pictorial element.

Figure 11:
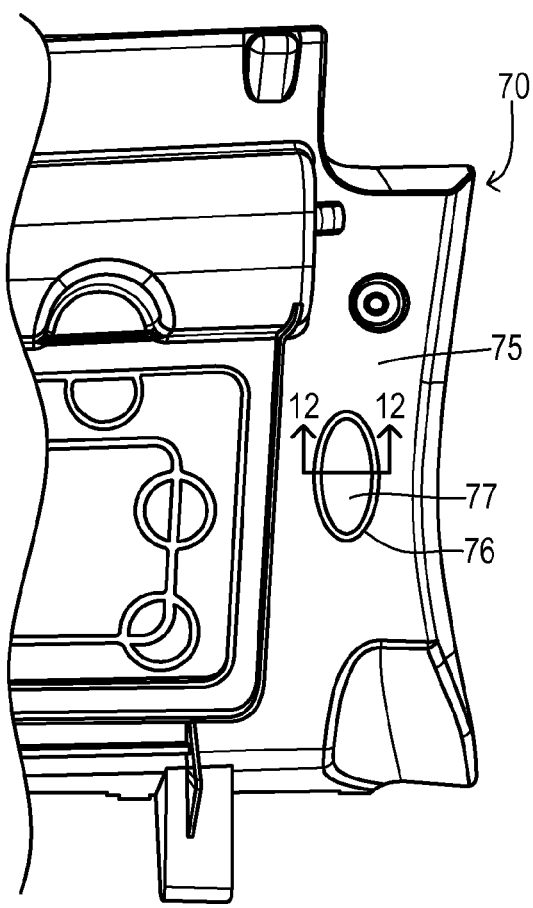
FIG. 11 is a plan view of the outer side of a door inner liner according to an embodiment with a pop-out plug.

In addition to a fixed structure as shown, dynamic elements such as a tethered plug or a pressure-responsive region that tears open or pops open to allow a gas flow without creating significant back pressure. As shown in FIG. 11, for example, door inner liner 70 may be provided with an aperture 76 for receiving a plug 77 that is aligned with the vent opening in the bladder member. Plug 77 may be similar to a "delete cover" often used for molded plastic trim surfaces in vehicles when particular optional equipment is not installed but a common trim panel is being used. Plug 77 is configured so that the retention forces holding plug 77 within aperture 76 are much less than the force it receives from inflation gas during deployment of the active bolster.

Figure 12:
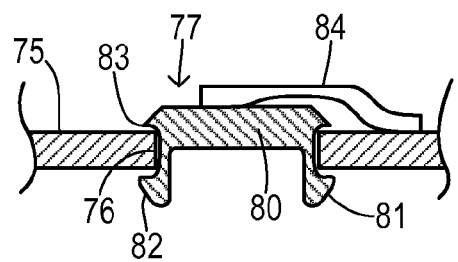
FIG. 12 is a cross section through the pop-out plug along line 12-12 of FIG. 11.

As shown in FIG. 12, plug 77 has a main body 80 supporting legs or clips 81 and 82 interfacing with an interior side of wall 75 and a lip or projection 83 interfacing with the exterior side of wall 75. Legs 81 and 82 are bendable in response to pressure applied to body 80 by the inflation gas, thereby releasing plug 77 from aperture 76. A tether 84 may be attached to plug 77 and wall 75, if desired, for retaining plug 77 after being ejected from aperture 76. Alternatively, since the active glove box door is closed during deployment, a tether may be unnecessary since plug 77 would be ejected in a car forward direction within the closed glove box.

Figure 13:
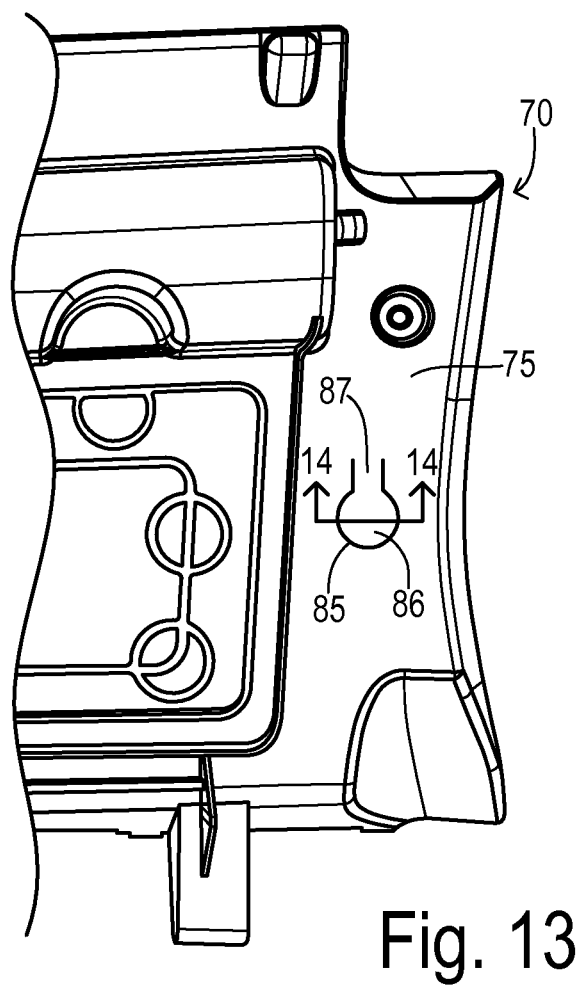
FIG. 13 is a plan view of the outer side of a door inner liner according to an embodiment with a tear seam defining a vent door.
Figure 14:
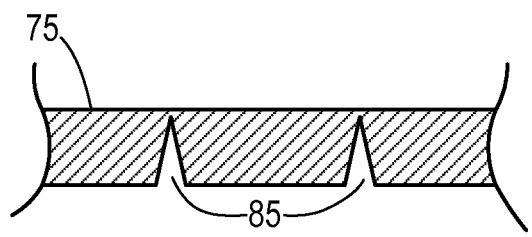
FIG. 14 is a cross section through the tear seam forming a vent door along line 14-14 of FIG. 13.

FIG. 13 shows an alternative embodiment wherein wall 75 is provided with a tab 86 defined by a tear seam 85. Tab 86 includes a hinge extension 87 to create a living hinge so that upon inflation, wall 75 tears along tear seam 85 to open a vent hole coinciding with the vent opening in the bladder wall. Tab 86 pivots outward and is retained by hinge 87. As shown in FIG. 14, tear seam 85 is created by a score line that extends a majority of the way through the thickness of wall 75. The thickness of uncut material is controlled so that tearing occurs at a sufficiently low pressure. Scoring for tear seam 85 may be obtained using laser cutting or by cutting with a knife as known in the art.

What is claimed is:

1. An active glove box door for mounting in an opening of an instrument panel in an automotive vehicle, comprising:
   a plastic-molded front wall for deploying outward from the opening;
   a plastic-molded bladder member joined along an outer perimeter with the front wall by a hot weld seam to form an inflatable bladder, wherein the bladder member includes at least one substantially circumferential pleat adjacent the weld seam for unfolding in response to an inflation gas injected into the inflatable bladder during a crash event; and
   a door inner liner joined to a central region of the bladder member and forming a generally continuous plate behind the bladder member, the door inner liner interfacing with the instrument panel to provide a reaction surface for expansion of the bladder member;
   wherein the pleat has a peak disposed proximate to the door inner liner, wherein the peak includes a vent opening that delineates a gas collision region on the door inner liner, wherein proximity of the collision region partially obstructs the vent opening, and wherein the door inner liner includes a plurality of perforations in the collision region permitting flow of inflation gas from the vent opening through the door inner liner.

2. The active glove box door of claim 1 wherein the pleat has a plurality of vent opening in the peak delineating a plurality of collision regions, and wherein each collision region includes a respective plurality of perforations.

3. The active glove box door of claim 1 wherein the perforations are arranged in a grille pattern.

4. The active glove box door of claim 1 wherein the perforations are arranged in a logo pattern.

5. The active glove box door of claim 1 wherein the door inner liner is comprised of molded plastic, and wherein the door inner liner is hot welded to the bladder member.

6. The active glove box door of claim 1 wherein the perforations are closed by a respective plug that is ejected by the inflation gas.

7. The active glove box door of claim 1 wherein the perforations are defined by respective tear seams that tear open in response to the inflation gas.

8. An active glove box door comprising:
   an inflatable bladder including an expanding front wall and a bladder wall with a pleat having a vent; and
   an inner liner forming a generally continuous plate behind the bladder wall to provide a reaction surface for expansion of the bladder;
   wherein the inner liner includes perforations in a gas collision region delineated by the vent to permit flow of inflation gas exiting the vent through the inner liner.

9. An active glove box door for mounting in an opening of an instrument panel in an automotive vehicle, comprising:
   a plastic-molded front wall for deploying outward from the opening;
   a plastic-molded bladder member joined along an outer perimeter with the front wall by a hot weld seam to form an inflatable bladder, wherein the bladder member includes at least one substantially circumferential pleat adjacent the weld seam for unfolding in response to an inflation gas injected into the inflatable bladder during a crash event; and
   a door inner liner joined to a central region of the bladder member and forming a generally continuous plate behind the bladder member, the door inner liner interfacing with the instrument panel to provide a reaction surface for expansion of the bladder member;
   wherein the pleat has a peak disposed proximate to the door inner liner, wherein the peak includes a vent opening that delineates a collision region on the door inner liner, and wherein the door inner liner includes a pressure relief feature in the collision region that opens in response to the inflation gas to permit flow of inflation gas from the vent opening through the door inner liner.

10. The active glove box door of claim 9 wherein the pressure relief feature is comprised of an aperture and a removable plug.

11. The active glove box door of claim 9 wherein the pressure relief feature is comprised of a tear seam defining a tab and a living hinge.

* * * * *